(12) United States Patent
Battlogg et al.

(10) Patent No.: US 8,985,288 B2
(45) Date of Patent: Mar. 24, 2015

(54) VALVE FOR A MAGNETORHEOLOGICAL LIQUID

(75) Inventors: Stefan Battlogg, St. Anton im Montafon (AT); Juergen Poesel, Bludenz (AT); Gernot Elsensohn, St. Anton im Montafon (AT)

(73) Assignee: Inventus Engineering GmbH, St. Anton im Montafon (AT)

( * ) Notice: Subject to any disclaimer, the term of this patent is extended or adjusted under 35 U.S.C. 154(b) by 191 days.

(21) Appl. No.: 13/518,644

(22) PCT Filed: Dec. 23, 2010

(86) PCT No.: PCT/EP2010/007903
§ 371 (c)(1),
(2), (4) Date: Jun. 22, 2012

(87) PCT Pub. No.: WO2011/076415
PCT Pub. Date: Jun. 30, 2011

(65) Prior Publication Data
US 2012/0313020 A1 Dec. 13, 2012

(30) Foreign Application Priority Data
Dec. 23, 2009 (DE) .......................... 10 2009 060 525

(51) Int. Cl.
*F16K 31/02* (2006.01)
*F16K 31/08* (2006.01)
(Continued)

(52) U.S. Cl.
CPC ............... *F16K 31/082* (2013.01); *F16F 9/537* (2013.01); *F16K 13/10* (2013.01); *F16K 31/0675* (2013.01); *Y10S 137/909* (2013.01)

USPC .......... 188/267.2; 188/267; 251/65; 137/909; 137/807

(58) Field of Classification Search
USPC ........... 188/267, 267.1; 251/65; 137/909, 807
See application file for complete search history.

(56) References Cited

U.S. PATENT DOCUMENTS 6,019,201 A 2/2000 Gordaninejad et al.
6,131,709 A 10/2000 Jolly et al.
(Continued)

FOREIGN PATENT DOCUMENTS

DE 299 13 326 U1 9/1999
DE 198 16 208 A1 10/1999
(Continued)

OTHER PUBLICATIONS

Electronic Translation of WO 2009/040066 A1.*

*Primary Examiner* — Anna Momper
(74) *Attorney, Agent, or Firm* — Laurence A. Greenberg; Werner H. Stemer; Ralph E. Locher

(57) ABSTRACT

A valve for a magnetorheological fluid is formed with a duct through which the magnetorheological fluid can flow and which can be exposed to a variable magnetic field such that the flow resistance of the duct can be set using the magnetic field in the duct. The magnetic field can be lastingly generated using a magnet device that is made at least in part of magnetically hard material. The magnetization of the magnet device can be lastingly modified by a magnetic pulse of a magnetic field generation device in order to lastingly change the magnetic field in the duct and thus the flow resistance of the duct. A valve of the invention requires energy only to change settings while a specific setting can be lastingly maintained without supplying energy.

12 Claims, 6 Drawing Sheets

(51) Int. Cl.
*F16F 9/53* (2006.01)
*F16K 13/10* (2006.01)
*F16K 31/06* (2006.01)

(56) References Cited

U.S. PATENT DOCUMENTS

| | | |
|---|---|---|
| 6,186,176 B1 | 2/2001 | Gelbmann |
| 6,471,018 B1 | 10/2002 | Gordaninejad et al. |
| 6,740,125 B2 | 5/2004 | Mosler |
| 7,677,370 B2 | 3/2010 | Battlogg et al. |
| 8,205,728 B2 * | 6/2012 | Bose et al. .................... 188/267 |
| 8,302,327 B2 * | 11/2012 | Battlogg ........................ 36/29 |
| 2006/0016649 A1 | 1/2006 | Gordaninejad et al. |
| 2008/0060710 A1 | 3/2008 | Barlson et al. |
| 2008/0155862 A1 | 7/2008 | Battlogg et al. |
| 2010/0199519 A1 | 8/2010 | Battlogg |
| 2012/0119123 A1 | 5/2012 | Battlogg et al. |

FOREIGN PATENT DOCUMENTS

| | | |
|---|---|---|
| DE | 201 03 782 U1 | 5/2001 |
| DE | 102 14 357 A1 | 10/2003 |
| DE | 103 37 516 A1 | 3/2005 |
| DE | 10 2007 045 110 A1 | 4/2009 |
| DE | 11 2007 001 932 T5 | 7/2009 |
| DE | 10 2009 034 297 A1 | 2/2011 |
| EP | 1 795 428 A1 | 6/2007 |
| WO | 99/27273 A2 | 6/1999 |
| WO | 2007/014413 A1 | 2/2007 |
| WO | 2009/040066 A1 | 4/2009 |

* cited by examiner

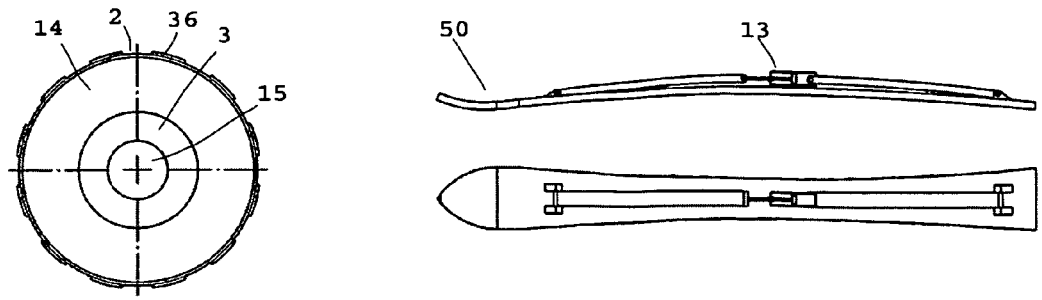
Fig. 9
Fig. 12
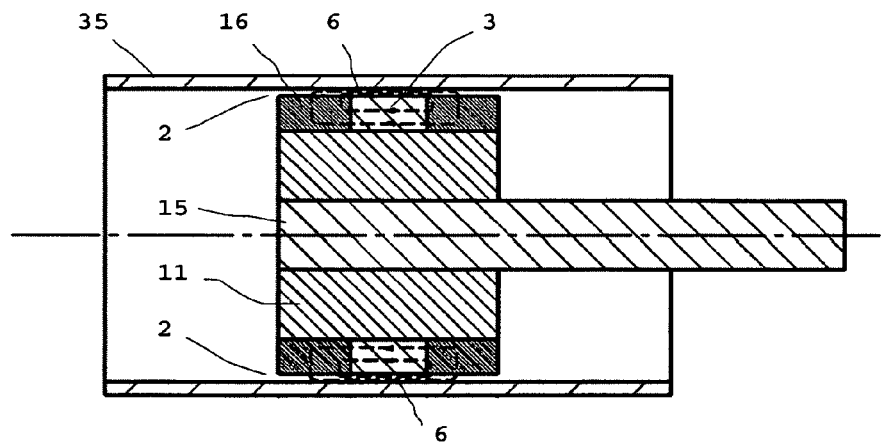
Fig. 10
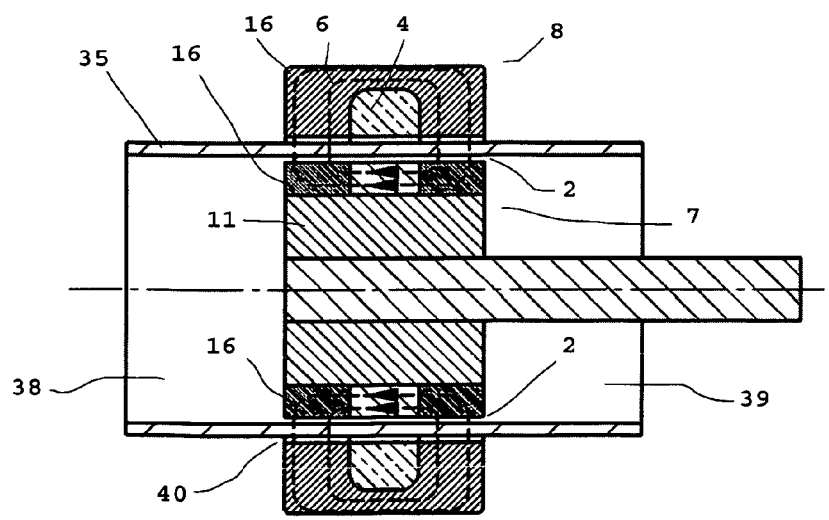
Fig. 11

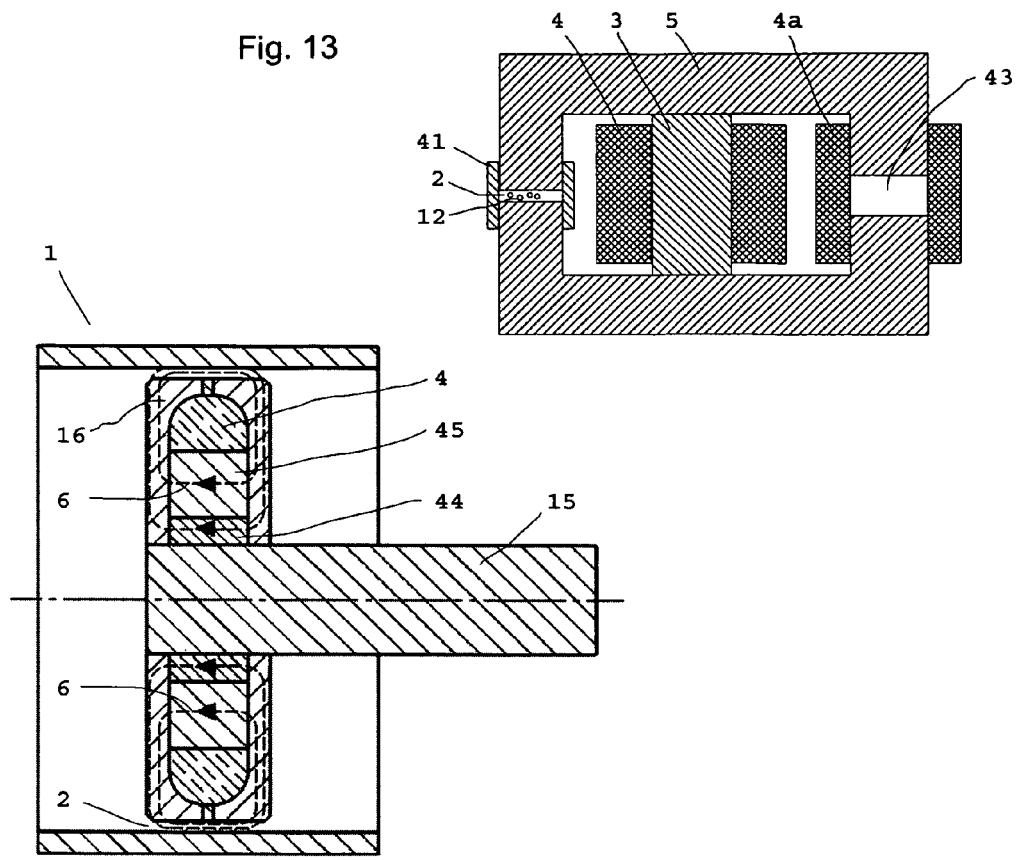
Fig. 13
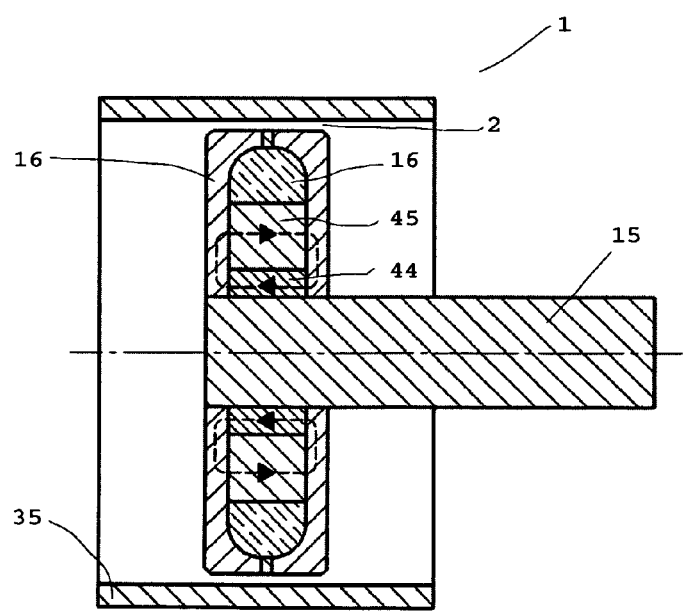
Fig. 14
Fig. 15

VALVE FOR A MAGNETORHEOLOGICAL LIQUID

BACKGROUND OF THE INVENTION

Field of the Invention

The present invention relates to a valve for a magnetorheological fluid, with a flow duct, with regard to which the through flow of the magnetorheological fluid through the flow duct can be varied by means of a magnetic field acting upon the flow duct. The flow resistance through the flow duct and consequently the through flow through the valve are influenced appropriately by the magnetic field.

Magnetorheological fluids are usually composed of a suspension of small ferromagnetic particles, such as, for example, carbonyl iron powder, which are finely distributed in a carrier fluid. The particles typically have diameters of between 0.1 and 50 micrometers and form chain-like structures under the influence of a magnetic field, so that the viscosity of the magnetorheological fluid increases considerably under the influence of a magnetic field. The change in viscosity takes place in this case very quickly in the range of a few milliseconds or less and is entirely reversible.

Essential advantages of a valve with a magnetorheological fluid are very rapid switching times in the range of a few milliseconds or less and the possibility of dispensing with moved mechanical elements.

Those valves for magnetorheological fluids in which the through flow through the valve is controlled via an electromagnet have become known in the prior art. Owing to the direct dependence of the flow resistance upon the magnetic field of an electromagnet, such a valve can be controlled in a simple way.

The disadvantage of such a system according to the prior art is, however, the permanent energy demand. In order to maintain the magnetic field, current has to flow constantly in the coil of the electromagnet. Particularly in applications where a magnetic field constantly has to be present, the energy demand of such a system is therefore high.

In order to lower the energy demand of such valves, valves for magnetorheological fluids have become known in the prior art in which a permanent magnet stipulates an operating point of the valve and deviations from the operating point are set by means of an electromagnet. The energy demand can consequently be lowered in many cases, since, in an application where the through flow through the valve has to be varied only within narrow limits, only the respective minor change in the magnetic field has to be generated electrically. Moreover, the use of a permanent magnet can ensure an emergency running function if the power supply fails or a defect occurs in the control or in the coil.

However, any deviation from this operating point again requires energy for the electromagnet. Permanent deviations consequently require energy permanently. Such a valve is therefore advantageous especially when there is a preferred operating point which is assumed for a major part of the operating time.

In many applications, however, a preferred operating point present for a major part of the operating time cannot be determined. This is the case, for example, with regard to a valve which is completely open and completely closed with identical frequency.

However, considerable energy consumption also arises, for example, when the through flow resistance of the valve is varied constantly or when different states are present for lengthy periods of time in each case. In such a case or in other cases, various states may also be present with equal entitlement, and therefore a permanent magnet for stipulating a preferred operating point in the valve affords only a minor or even no energy saving.

Against the background of the prior art described, the object of the present invention, therefore, is to make available a valve for magnetorheological liquids, which can be set variably and which has a lower energy demand.

BRIEF SUMMARY OF THE INVENTION

This object is achieved by means of a valve according to the invention for magnetorheological fluids having the features as claimed. Preferred developments are the subject matter of the subclaims. Further advantages and features of the present invention may be gathered from the exemplary embodiments.

The valve according to the invention for a magnetorheological fluid comprises at least one flow duct through which the magnetorheological fluid is capable of flowing and the through flow of which is to be controlled. The flow duct or at least one flow duct can in this case be exposed to at least one variable magnetic field, so that the flow resistance of the flow duct and therefore also of the valve can be set via the magnetic field in the flow duct. The magnetic field is capable of being generated permanently by a magnetic device composed at least partially of hard-magnetic material. In this case, the magnetization of the hard-magnetic material can be varied permanently by at least one magnetic pulse from a magnetic field generation device, in order to vary permanently the magnetic field acting in the flow duct and, consequently, the flow resistance of the flow duct.

A valve according to the invention has many advantages, above all the possible change in magnetization of the magnet via magnetic pulses from the magnetic field generation device. It thereby becomes possible that the magnetic properties of the magnetic device can be varied permanently, for example, by means of a single brief pulse. Energy only for a short period of time is necessary for the brief magnetic pulse, while the field of the magnetic device is thereafter present permanently.

There are many different possibilities for using a valve according to the present invention, for example it can be used in a shock absorber.

In the valve according to the invention, it is preferably possible via the magnetic field acting in the flow duct to prevent a flow of the magnetorheological fluid. Depending on the magnetic field taking action, the valve can shut off completely up to a certain pressure difference and, in the case of a higher pressure difference, cause corresponding flow resistance.

Precisely in a mobile application, such as, for example, a valve in the shock absorber of a knee prosthesis, where different damping properties are required, depending on the wearer and the wearer's activity, optimization in terms of an operating point is not an advantage and the permanent energy demand is a considerable disadvantage. The invention affords the considerable advantage here that a single pulse is sufficient to stipulate a value permanently. If, for example, the person with the knee prosthesis stands in one place for a lengthy time, the damping behavior can remain unchanged for this entire period of time. A considerable fraction of energy can thereby be saved, without a loss of comfort consequently arising. Conversely, the setting of the knee joint can be adapted optimally to the respective situation and the lifetime of the battery used for power supply can nevertheless be increased.

The magnetic field generated by the magnetic device in the flow duct acts without any energy supply and maintains its field strength permanently as long as it is not influenced by external circumstances, such as, for example, other magnetic fields, temperature influences or natural aging processes. For example, the magnetic field collapses sharply when the Curie temperature of the magnet is reached.

Even in the event of a more frequent change in the operating point of a valve according to the invention, energy is not required constantly, but only for the brief time interval of the magnetic pulse. Thus, even in the case of frequent adjustment, an energy saving is possible, as compared with a valve according to the prior art, the energy saving becoming the greater, the less often the operating point is adjusted.

A further advantage is the possibility of allowing an emergency running function. If, for example, the lowering of the supply voltage indicates that the energy supply will soon fail (accumulators almost empty, mains power failure, etc.), a defined state of the valve can be set by means of a final pulse.

In the context of this application, a period of time is deemed to be permanent which is longer by a multiple than the duration of the magnetic pulse. In particular, periods of time of at least several seconds, minutes, hours, days or longer are meant by this. However, the set magnetization does not have to remain expressly the same forever, since it may be subject to natural fluctuations and attenuation phenomena. In contrast to this, the duration of the magnetic pulse required for variation is relatively short. The duration of the, in particular, single brief pulse is in this case preferably less than 1 minute and preferably less than 1 second.

The ratio between the length of time of the virtually uniform permanent magnetization of the magnetic device and the duration of the magnetic pulse is usually higher than 10, in particular higher than 100 and preferably higher than 1000. Ratios of 10 000, 100 000, one million and even much greater values are possible and are preferred.

A material is deemed here to be hard-magnetic when its coercivity lies above 1 kA/m and, in particular, above 10 kA/m. The region having hard-magnetic properties is hereafter called "magnet", and this term may be understood in the context of this application as also meaning a permanent magnet.

Preferably, the permanent magnetization of the magnetic device is capable of being set to any desired value between zero and retentivity by means of at least one magnetic pulse from the magnetic field generation device. In this case, preferably, the polarity of the magnetization may also be variable.

It is possible to vary the magnetic field acting in the flow duct, without permanently varying the magnetization of the hard-magnetic region of the magnetic device. Preferably, a permanent static magnetic field is capable of being generated by means of the magnetic device, which magnetic field can be overlaid with a dynamic magnetic field of the magnetic field generation device or else a further magnetic field generation device, without the permanent magnetic field of the magnet thereby being varied.

Especially preferably, the magnetic field generation device comprises at least one electrical coil or is designed as such. Electrical coils can generate strong magnetic fields and can be designed with a small build, so that they are also suitable for use on small valves. The magnetic field generation device is designated hereafter simply as a coil, but other devices and methods, such as, for example, a relatively strong permanent magnet, may also be used.

An electromagnet or coil is therefore suitable, above all, as a magnetic field generation device, since very strong magnetic fields can be generated in a short time and adjustment can take place purely electrically. Moreover, the desired magnetization can be set in a directed way. The set value may lie, as desired, between zero and the maximum retentivity of the magnet or between negative and positive retentivity when the polarity of the magnet is reversed.

Preferably, at least one capacitor device is provided in order to make available the energy for generating at least one magnetic pulse.

Advantageously, at least one energy accumulator and, in particular, a battery is provided in order to make available the energy for generating at least one magnetic pulse.

In all refinements, preferably at least one control and/or check device is provided in order to output magnetic pulses of the magnetic field generation device in a controlled and/or regulated manner.

To detect the actual data and/or the position of the valve, at least one sensor device may be provided. Sensors can be used for the direct or indirect determination of the magnetization of the magnetic device. These sensors or their measurement results are capable of being used by a control or regulation device in order to determine the strength of the magnetic pulses to be generated.

For example, a magnetic field sensor may be provided which determines the magnetic field strength in the flow duct or which derives a measure of the magnetic field strength in the flow duct. Physical quantities dependent directly upon the magnetic field can be detected and the magnetic field can be determined from them. It is also possible to use further sensors, such as, for example, a temperature sensor. Moreover, force, pressure, displacement or acceleration sensors may be used in order to obtain data for control or regulation.

The shape and strength of the magnetic field generated can be influenced by means of suitable sensors and at least one coil. The sensors may be integrated into the valve or measure external parameters which influence regulation.

It is preferable to provide at least one resonant circuit device so that a damped magnetic alternating field can be generated for demagnetization.

Preferably, at least one flow duct is designed as a shallow gap or comprises a shallow gap which may be straight or else curved. A curved shallow gap is understood in the context of this application to mean a segment of a circular ring or a complete circular ring. Especially homogeneous magnetic fields can be generated in a gap.

In order to achieve a wide setting range in the smallest possible construction space, a plurality of individual gaps may be used. The magnetic circuit can in this case be kept small if the individual gaps lie one above the other (in series in the magnetic circuit). The cross-sectional area flooded by the magnetic field does not change with the number of gaps, but the field strength must be adapted to the sum of the individual gap heights.

Advantageously, the magnetic device is composed at least partially of a hard-magnetic material, the coercivity of which is greater than 1 kA/m and, in particular, greater than 5 kA/m and preferably greater than 10 kA/m. This part may also be designated as a magnet or core which permanently makes available the field strength to be generated.

The magnetic device may also be composed at least partially of a material which has a coercivity lower than 1000 kA/m and preferably lower than 500 kA/m and especially preferably lower than 100 kA/m.

Preferably, the valve and, in particular, the magnetic device are composed at least partially of such a material and are structured in such a way that a magnetic flux density of at least 0.3 T and, in particular, at least 0.5 T can be generated in the flow duct.

In all refinements, it is preferable that the flow duct is capable of being exposed to an inhomogeneous magnetic field. The inhomogeneity of the magnetic field in the flow duct is in this case, in particular, so great that the ratio between the maximum and minimum field strength is higher than 50 and, in particular, higher than 1000 and, preferably, higher than 50 000.

In this case, the shape and strength of the magnetic field in the magnetic device or in the flow duct are maintained permanently. If required, the shape and strength of the magnetic field are capable of being varied permanently by at least one magnetic pulse from the magnetic field generation device. The shape and strength of the magnetic field may also be modified variably in time or locally by means of directed modulation.

The cross-sectional area or length of the flow duct, parts of the magnetic device and/or the magnetic field generation device may be movable in relation to one another.

In all cases, in particular, the magnetic device ensures a closed magnetic circuit around the flow duct, the magnetic field in the flow duct being capable of being generated by the magnet, in particular without the supply of external energy.

By means of the or at least one magnetic field generation device, a permanent setting and/or variation of the magnetization of the magnetic device can be carried out. Preferably, for this purpose, an electrical coil is used which generates by means of a current pulse a magnetic pulse which overlays the field of the magnetic device. By means of directed control of the current strength of the electrical coil, a defined magnetic pulse can be generated which, on account of the remaining magnetization of the magnet, sets a corresponding exactly defined field strength in the magnetic device. The magnetization of the magnet can be strengthened, attenuated, canceled or reversed in polarity as a function of the strength of the pulse.

In all refinements, it is conceivable to overlay the preset magnetic field of the magnet with an additional magnetic field of a coil, without the permanent magnetization of the magnet being varied. For this purpose, either the already existing coil or an additional coil may be used.

This is advantageous, for example, when different operating points are required and minor, but continuous or discrete adaptation is necessary at each operating point. Slower actions, such as, for example, temperature compensation, can take place via a change in magnetization, while rapid actions in real time can be overlaid with the additional coil field.

Advantageously, at least one capacitor device with one or more electrical capacitors is provided. This affords the possibility of storing energy for one or more magnetic pulses, so that, even if a current source of low power is used, a desired magnetic pulse can be triggered after the charging of the capacitor.

The provision of energy in a capacitor device can increase the reaction rate of the system, and moreover a higher voltage accelerates the build-up of a field by the coil. It is also possible via the charging voltage of the capacitor device to determine the strength of the magnetic pulse, without varying the pulse duration. Instead of or in addition to a capacitor device, other devices may also be used in order to store at least part of the energy for at least one pulse. What may be envisaged are, for example, inductive accumulators, such as coils or transformers.

The magnet of the magnetic device must be capable in the existing magnetic circuit, on the one hand, of generating a high magnetic field strength, but on the other hand the energy necessary for magnetic reversal should not be too great. It is conceivable to manufacture only part of the magnetic device, the magnet, from hard-magnetic material and the rest from a material with low magnetic resistance (reluctance) and with high saturation flux density. Advantageously, this magnet is arranged in the coil or in the immediate vicinity of the latter, since the coil field for magnetic reversal is the strongest there and can also be controlled in the best way.

It is also possible, however, to manufacture the entire magnetic device from hard-magnetic material, in which case relatively more material is available for generating the field or the magnetic requirements to be fulfilled by the material become lower.

Advantageously, the magnet is composed at least partially of a material which has a coercivity greater than 1 kA/m (=1000 ampere/meter) and, in particular, greater than 5 kA/m and preferably greater than 10 kA/m. In particular, coercivities of 30 kA/m, 40 kA/m or 50 kA/m or even 100 kA/m or 150 kA/m are also possible.

Especially preferably, the magnet or magnetic device is composed at least partially of a material which has a coercivity lower than 1500 kA/m (=1 500 000 ampere/meter) and preferably lower than 500 kA/m and especially preferably lower than 200 kA/m. The coercivity lies especially preferably in a range of between 10 kA/m and 200 kA/m.

Preferably, the magnetic device is composed at least partially of a material, such as Alnico (AlNiCo) or of a magnetic steel alloy or of a material having comparable magnetic properties. Alnico is an alloy of aluminum, nickel and cobalt and partially also of other elements, such as, for example, iron or copper. Permanent magnets can be produced from Alnico which can usually have a retentivity of 0.7 to 1.2 T and a coercivity of 30 to 150 kA/m or more.

An Alnico magnet has relatively high coercivities and opposes correspondingly high resistance to external magnetic fields, so that magnetic reversal or demagnetization is not achieved in the closed magnetic circuit by means of normal fields occurring in nature. On the other hand, the coercivity is relatively low, as compared, for example, with neodymium, and therefore demagnetization with relatively low energy consumption is possible with an electromagnet or an electrical coil.

Another advantage of Alnico is the profile of the demagnetization curve (second quadrant in the BH graph), the high thermal stability and the good chemical properties in relation to other conventional magnetic materials.

The strength of magnetization depends on the strength of the magnetic pulse, but not on the length of the magnetic pulse, as soon as a certain minimum pulse duration is reached. What is defined as the minimum pulse duration is that period of time after which the magnetizable material has reached a magnetization corresponding to the respective pulse strength. In particular, this is understood to mean that period of time after which the magnetizable material has reached a maximum magnetization corresponding to the respective pulse strength. After the minimum pulse duration is reached, longer pulses of equal strength no longer increase magnetization. The current strength of the coil or the charging voltage of the capacitor may be used as a measure of the magnetic pulse strength.

This minimum pulse duration depends on many factors, for example the set-up and the material of the magnetic circuit influence the formation of eddy currents which counteract a change in the magnetic field or which delay its change. Within this minimum pulse duration, the strength of the magnetic pulse can also be varied by means of the pulse duration.

The pulse length of the magnetic pulses is, in particular, lower than 1 minute, preferably the pulse length is lower than 1 second and especially preferably lower than 10 milliseconds. For a permanent variation and setting of the magnetization of the magnet, magnetic pulses with a pulse length in the region of a few microseconds can be sufficient, the set magnetization of the magnet subsequently being available permanently for minutes, hours, days and even longer periods of time, until magnetization is varied anew by means of the next magnetic pulse. The ratio of the duration of the permanent variation in the magnetization of the magnet to the pulse length of the magnetic pulse is greater than 10 and, in particular, greater than 1000 and may be very much greater. If it becomes necessary in a short time sequence to output a plurality of magnetic pulses in order to change the set magnetization of the magnet, the duration of variation in the magnetization of the magnet by the magnetic pulses may even be lower than 10. However, this in no way changes the situation where the state of magnetization of the magnet would continue to persist without further magnetic pulses.

The device for generating the magnetic pulse normally limits the minimum pulse duration, and times in the region of hundredths or tenths of seconds or a few milliseconds or less are also possible.

Since the flow duct opposes relatively high resistance to the magnetic flux, small gap heights are advantageous. Gap heights in the range of 0.5 to 2 mm have proved appropriate, even ranges of 0.1 to 10 mm or else 0.01 to 100 mm being conceivable in specific applications.

The gap length is essentially dependent on the maximum counterforce to be achieved and on the flow velocity. The chain formation of the particles in the magnetic field lasts for a certain time (dwell time, usually lower than 1 ms). During this time, the pressure difference corresponding to the magnetic field is built up. If the gap length is shorter than the product of the dwell time and flow velocity, the particles pass through the flow duct before chain formation is concluded completely. The achievable pressure difference in this case falls markedly and the system does not operate efficiently.

As a result of structural measures, for example, bundling of the magnetic flux lines can be achieved, with the result that an even higher flux density becomes possible in the gap or flow duct. In this case, the ratio of the flux densities in the magnet or in the flow duct can be influenced via the ratio of the flooded areas.

In specific applications, it is advantageous if not only the strength, but also the shape of the magnetic field can be varied in the flow duct. If the valve is used, for example, as a shock absorber, the flow duct can be divided into various regions via an inhomogeneous field.

Regions with no field or only a very low field are designated as passage sections and regions with a strong field as blocking sections. The regions lying between them are the transition sections in which the field strength rises from a low value to a higher value.

The aim by means of a bypass or passage section is to obtain a zero crossing of the force/velocity profile, in which a stationary piston begins to move even under low or very low forces and therefore damps shocks which occur.

At low velocities, the magnetorheological fluid flows solely through the bypass. With a rise in flow velocity, the pressure loss in the bypass increases, with the result that the magnetorheological fluid begins to flow in ever larger regions of the transition section. The higher the pressure differences, the larger the bypass therefore becomes and the smaller the transition section becomes. The force/velocity profile of the damper flattens off through the transition section.

When a critical value is reached at which the shear stress of the magnetorheological fluid is reached and overshot in the blocking section, the magnetorheological fluid flows in the entire flow duct. As a result, as the velocity rises further, the pressure rises to a lesser extent than before.

This behavior, the zero crossing and the flattening-off profile of the force/velocity curve, is desirable, above all, in bicycle shock absorbers. Above all due to the smooth transition from the low speed range to the high speed range, a shock absorber is distinguished by high travel comfort and increased safety due to better road contact.

A valve according to the invention makes it possible that not only the strength, but also the shape of the magnetic field can be varied by means of a pulse and can be held permanently without any further supply of energy.

This becomes possible, for example, when a plurality of coils of a magnetic field generation device act upon a magnet and thus bring about locally different magnetizations. It is advantageous if the magnet is in this case in the immediate vicinity of the flow duct, since the locally different magnetization of the magnet can thus generate an inhomogeneous magnetic field in the flow duct.

Conversely, it may be advantageous if the magnet and flow duct are spaced apart from one another at different locations in the magnetic circuit, the magnet and flow duct being connected magnetically to one another via field-guiding elements, such as poles. As a result of the field-guiding elements, a field which is possibly inhomogeneous locally in the magnet can become uniform and act homogeneously in the flow duct. Above all when a plurality of magnetic field generation devices jointly act on a flow duct, a set-up can thus be especially advantageous.

The invention is also aimed at a shock absorber, an above-described valve being used in the shock absorber or on the shock absorber in order to set or to influence the damping.

Shock absorbers with magnetorheological fluid, which are constructed according to the prior art, can with relatively little outlay be modified in order to be able to make use of the method according to the invention and the advantages resulting therefrom.

A shock absorber with at least one valve integrated into the piston is also possible and preferred, the magnetic device being arranged in the piston, and the cylinder which surrounds the piston not having to be part of the magnetic device, and the magnetic field generation device being capable of being located outside the cylinder.

The invention also relates to a nozzle for magnetorheological liquids, the design of the nozzle corresponding essentially to an above-described valve. Nozzle designates here, in most general terms, a system in which the flow of the magnetorheological fluid first experiences a change in cross section before or after it enters the magnetizable region. The change in cross section may in this case take place, for example, by means of a narrowing or a widening, while the change in cross section may be continuous or else discontinuous.

In preferred refinements, individual regions of the magnetic device have different hard-magnetic properties, for example due to different materials or different geometries, with the result that they can be divided into regions with fixed or variable magnetization in the case of a corresponding magnetic field of the field generation unit.

Advantageously, the magnetic field generation unit is capable of being arranged or placed spaced apart from and without mechanical connection to the magnetic device.

The magnetic field generation device may be a separate unit which has to be connected to the magnetic device or brought into its vicinity solely for the magnetic reversal of the magnetic device, and in this case a sufficient connection may be a magnetic coupling.

In all refinements, it is preferable if the energy is transmitted linelessly. Transmission may take place, for example, by radio.

In all refinements, a plurality of magnetic circuits may act upon the flow duct, and the magnetic field can be generated differently in the individual magnetic circuits, for example by means of permanent magnets, variable permanent magnets, coils or a combination of these.

The magnetic field acting in the flow duct may be the sum of the individual magnetic fields of any number and combination of magnetic devices and magnetic field generation devices.

The method according to the invention serves for operating a valve, in which the magnetic field generated permanently by a magnetic device and acting upon a magnetorheological fluid in at least one flow duct is varied permanently by at least one magnetic pulse from the magnetic field generation device.

Preferably, the magnetic pulses are generated by at least one electrical coil which, in particular, is supplied with the required energy via at least one capacitor.

Preferably, the magnetic pulses are generated by at least one electrical coil, at least a fraction of the energy required for a pulse being stored intermediately in a capacitor.

In a development of the method, the energy required for adapting the valve to the respective operating state is derived from environmental conditions, such as vibrations, heat, pressure and the like, which can be derived as a result of the changes in the operating state or maladaptations of the valve.

Preferably, the strength of the permanent magnetization of the magnetic device can be varied via the strength and/or duration of the magnetic pulses from the magnetic field generation device.

In all cases, the magnetic field can be used for sealing off parts moved in relation to one another, in that corresponding flow differences or pressure differences are set.

Advantageously, the magnetic pulses are shorter than 1 minute, preferably shorter than 1 second and, in particular, shorter than 10 milliseconds.

The generatable field strength of the magnetic field generation device is sufficient, in particular, to magnetize the hard-magnetic parts of the magnetic device up to their magnetic saturation.

Preferably, at least the shape and/or the strength of the magnetic field of the magnetic device are/is varied permanently by at least one magnetic pulse from the magnetic field generation device. In this case, the pulses may also be output by means of at least two separately activatable coils.

The partial or complete demagnetization of the magnetic device may take place by means of a damped magnetic alternating field or at least one magnetic pulse. In order to cancel existing magnetization, a magnetic alternating field with a decreasing field strength may be adopted. A preferred version uses for this purpose a damped electrical resonant circuit. It is possible, however, also to use a train of individual magnetic pulses with decreasing intensity and with in each case reversed polarity in order to reduce or cancel the magnetization of the magnet. The resonant circuit device may be composed of a coil and a capacitor, in which case the coil of the magnetic field generation device may also be part of the resonant circuit.

In a design variant, the progress of demagnetization is made dependent upon the instantaneous magnetization of the magnet. For example, in the case of weak magnetization of the magnet, its demagnetization may take place by means of correspondingly weak pulses. The magnetic alternating field with decreasing intensity may begin with a correspondingly low intensity, with the result that time and energy can be saved.

It is possible that the magnetic device is demagnetized in a directed manner at certain time intervals or after a defined number of magnetic reversals, in order to rule out cumulative deviations. It is also possible that, before any change in magnetization, the magnetic unit is first demagnetized in order to set defined initial conditions.

The magnetic pulses are capable of being generated automatically by a control device or of being triggered manually in order to change the magnetization of the magnet device.

In specific cases, a benefit in terms of weight and of space can be achieved by utilizing the retentivity and the pulsation of a coil which does not always have to be live. The wires of the coil may have thinner and lighter dimensioning because they are in each case live only for a short operating time. This may afford benefits in terms of weight, space requirement and costs.

It may therefore be advantageous, in specific applications, that, on account of the pulsation of the electrical coil, the latter can be designed to be markedly smaller than if it had to be designed for a 100% switch-on duration. The heating of the coil usually plays no part in pulsation, since brief power loss peaks are buffered by the inherent heat capacity of the coil and of the components surrounding the coil. As a result, very high current densities can be tolerated in the windings or thinner lines can be used, as long as the average power loss remains acceptable for lengthy periods of time.

Usually, in the case of a smaller coil, the magnetic circuit surrounding the coil can also be smaller, and therefore a relatively large amount of construction space, material, weight and costs can be saved. In this case, only the energy consumption for an individual pulse increases, but this can easily be tolerated, depending on the application.

In all refinements, it may be possible to carry out the supply of power linelessly. Power supply, for example, from the current source to the power electronics or from the power electronics to the coil may take place via electrical, magnetic or electromagnetic coupling such as, for example, a radio link. Where a bicycle is concerned, the power supply may take place from outside, for example via a docking station. It is also possible to supply energy to all the consumers (fork, rear shock absorber, display) via an energy source on the bicycle. Power supply may also take place in a similar way in the case of a ski boot, ski or mobile telephone or to the sensors.

Energy supply by radio may possibly have lower efficiency than conventional wiring. Moreover, energy transmission and its range may be limited. Depending on the application, however, such disadvantages do not cause any trouble. It is advantageous that no wear of contacts occurs. Energy transmission is usually protected against polarity reversal and short circuit-proof, since there is only limited power on the secondary side. Furthermore, no cable break is possible and the device is, overall, more movable.

In such refinements, however, it is advantageous to intermediately store the energy for at least one pulse in a capacitor. The energy supply of the system can consequently have lower power, since brief power peaks of a pulse are absorbed by the capacitor. Moreover, discontinuous or pulsed energy supply may also be used.

A possible extension stage of the present invention is a completely independent system which is supplied wirelessly with energy. It is conceivable, for example, to have use in a shock absorber for a bicycle which is supplied with energy by at least one small magnet on a tire. When the wheel moves, the magnet is moved past the shock absorber or a coil on the shock absorber. A voltage is thereby induced in the coil and can be stored in the capacitor for the next pulse.

In general, any desired energy harvesting units for energy supply may therefore be used, for example solar cells, thermoelectric generators or piezo crystals. Elements which convert vibrations into energy can thus also be used highly advantageously for supplying a damping system. Even in exactly tuned damping, usually certain vibrations are still transferred which may serve at least for maintaining the system and for feeding the control and for data acquisition. If the energy converter is excited by higher vibrations because the instantaneous setting of damping is unsuitable or the terrain is of a corresponding type, energy is converted and is stored in the capacitor. If the damping deviation lasts sufficiently long or is great enough, the energy in the capacitor is sufficient to adjust the shock absorber to a new optimal value.

A version similar to an electrical toothbrush, in which the energy supply takes place by inductive coupling, may also be envisaged. In this case, for example, the accumulator of an independent shock absorber unit can be charged inductively, without damaged cables or corroded or soiled contacts obstructing the charging operation. Energy can be transmitted over longer distances by magnetic resonance. Further advantages and features of the present invention may be gathered from the exemplary embodiments which are explained with reference to the accompanying Figures.

BRIEF DESCRIPTION OF THE SEVERAL VIEWS OF THE DRAWINGS

In the Figures:

FIG. 9 shows the piston of the valve according to FIG. 7 in a diagrammatic front view;

FIG. 10 shows a further valve in a sectional diagrammatic illustration;

FIG. 11 shows the valve according to FIG. 10 during the setting of the field strength;

FIG. 12 shows diagrammatic illustrations of a ski having a shock absorber according to the invention;

FIG. 13 shows a highly diagrammatic view of a valve which can be influenced temporarily by a control circuit;

FIG. 14 shows a further valve in a sectional diagrammatic illustration; and

FIG. 15 shows the valve according to FIG. 14 in a sectional diagrammatic illustration and in another operating state.

DESCRIPTION OF THE INVENTION

Figure 1:
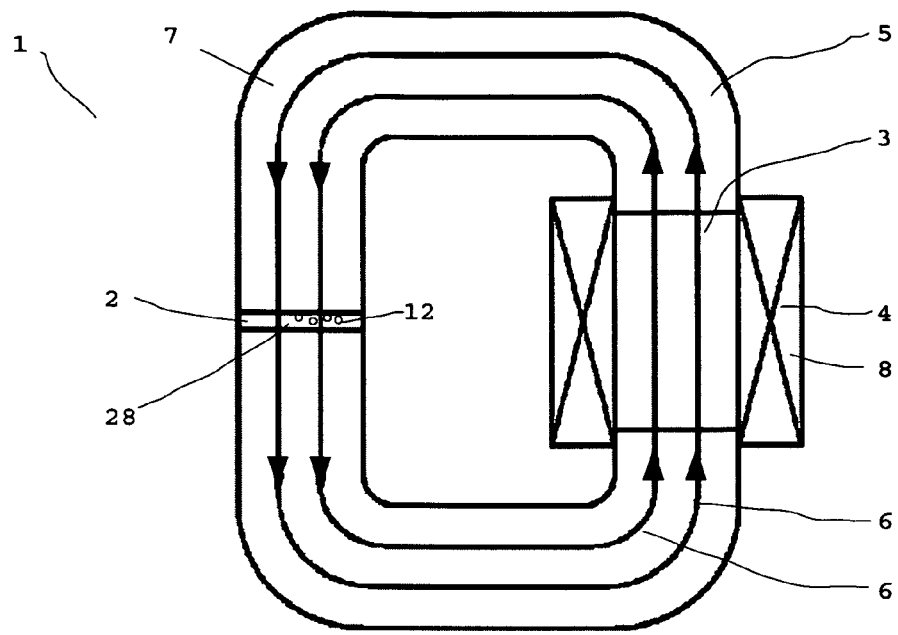
FIG. 1 shows a diagrammatic illustration of a valve according to the invention.

FIG. 1 shows a highly diagrammatic illustration of a valve 1 according to the invention. So that functioning can be illustrated more clearly, magnetic flux lines 6, illustrated as vectors, have been depicted.

In the region of the flow duct 2, the magnetic field 9 of the magnet or magnetic device 7 can act upon the magnetorheological fluid 12. In the magnetic field 9, the particles 30 of the magnetorheological fluid 12 are oriented and form chains, with the result that the viscosity of the fluid increases. The viscosity can be set, as desired, in a wide range via the strength of the effective magnetic field 9.

The shear stress which the magnetorheological fluid 12 can build up is also dependent upon the magnetic field 9. If the pressure difference in the flow duct 2 is lower than the shear stress, flow is prevented. Up to this limit, the valve 1 blocks the through flow of the magnetorheological fluid 12.

The flow duct 2 forms, together with the magnetic device 7 which here comprises the ring conductor 5 and the core 3 or magnet, a closed magnetic circuit. Advantageously, the magnetic device 7 is at least partially ferromagnetic and opposes low resistance (reluctance) to the magnetic flux.

In the exemplary embodiment according to FIG. 1, only the core 3 of the magnetic device 7 is composed of hard-magnetic material, but expressly any part of the magnetic device 7 may have at least partially hard-magnetic properties. The core 3 has been magnetized in a defined manner by a previously applied magnetic pulse 10. On account of its hard-magnetic properties, the core permanently maintains this magnetization and thus itself becomes a permanent magnet. The magnetic field 9 which determines the flow resistance of the valve 1 is generated by the core 3 without any supply of external energy and is maintained permanently without any further energy being supplied.

In addition, a magnetic field generation device 8 is present. The magnetic field generation device 8 is designed here as an electrical coil 4 and here surrounds the core 3. In many applications, it is sufficient to change the acting magnetic field 9 (cf. FIG. 2) only in the event of variations in the external operating conditions and to adapt it to the changed conditions. To change the magnetization of the magnetic device 7, a magnetic field 31 is generated by means of the coil. Depending on the size of the coil current, the coil 4 generates a corresponding magnetic field 31 which overlays the magnetic field 9 of the magnetic device 7. A short magnetic pulse 10 from the coil 4 or the magnetic field generation device 8 is sufficient to magnetize the core 3 permanently to any desired value.

The pulse duration 34 of the pulse 10 is usually determined by the magnetic field generation device 8, since, for example, the rise time of the coil current 4 is markedly longer than the time actually required for the magnetic reversal of the material of the magnetic device 8. Consequently, the field strength of the resulting magnetic pulse 10 can be set via the pulse duration 34, equivalent to the rise time of the coil current. The magnetic pulse 10, in turn, defines the permanent magnetization of the hard-magnetic material. Magnetization may permanently assume any desired value between zero (demagnetized) and a maximum (retentivity) or by magnetic reversal between a negative and positive maximum, as a function of the magnetic properties of the magnetic device 7. It is preferable that the generatable field strength 31 of the magnetic field generation device 8 is higher than the coercivity of the hard-magnetic material. In order to achieve saturation of the magnet 7, it is advantageous if the field strength generatable by the coil 4 reaches preferably approximately five times the value or more of the coercivity as a function of the magnetic material. This ensures that any magnetization of the magnetic device 7 can be carried out reliably and reproducibly.

Figure 2:
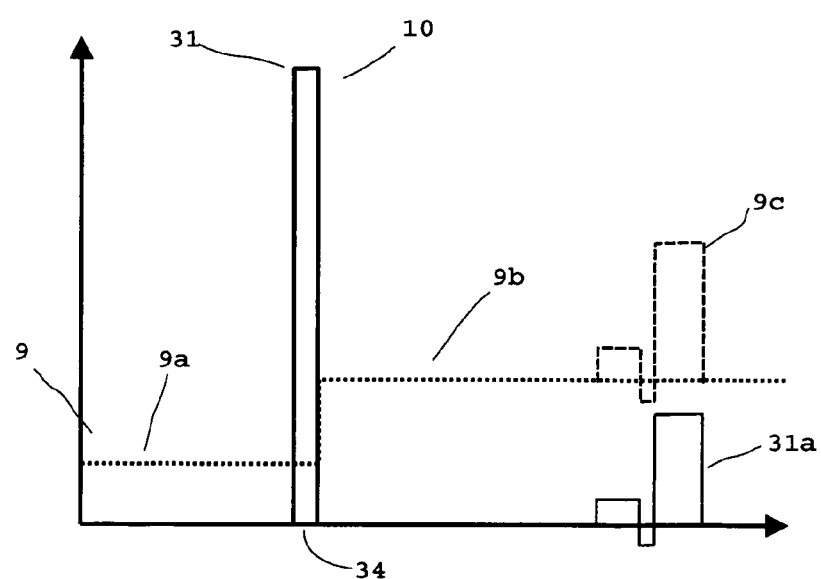
FIG. 2 shows a diagrammatic time graph of the magnetic field strengths during magnetic reversal.

FIG. 2 illustrates diagrammatically a magnetic reversal operation. The magnetic field strength 9 is illustrated against time, the field strength 9 of the magnetic device 7 being illustrated by dots and the field strength 31 of the magnetic field generation device 8 by an unbroken line. The magnetic field strength 9 of the magnetic device is in this case raised from a first field strength 9a to a higher second field strength 9b.

It can be seen clearly that, in the left part of the graph, the magnetic field generation device 8 is not operative, with the exception of the short pulse 10, and its field strength 31 is therefore also zero. Its field is not required for normal operation, and therefore there is also no need for energy to be supplied.

Energy is briefly required only for magnetic reversal, in this case in order to strengthen the magnetization 9 of the magnetic unit 7. For example, in this case, the magnetization 9 of the magnet 7 can be strengthened by means of a short current pulse in the coil 4 in order to increase the flow resistance of the valve 1 permanently.

While the pulse length 34 for the magnetic pulse 10 is only very short and may lie in the region of a few milliseconds, the magnet 7 or magnetic device 7 subsequently has permanently the high magnetic field strength 9b which, in the case of a corresponding magnetic field strength 31 of the magnetic pulse 10, may even extend to the saturation of the hard-magnetic material used.

It should be noted that the curve profiles in FIG. 2 are illustrated only diagrammatically. In detail, the pulse 10 does not have a jump, but instead a rise time which is dependent on the magnetic circuit 7 and the coil 4 and after which the field strength 31, maximum under the given preconditions, is set. In the case of a constant supply of the coil 4, the strength of the pulse 10 can be set within this rise time via the pulse duration 34.

From a certain pulse duration 34, longer pulses 10 do not cause any further increase in magnetization 9. The strength of the pulse 10 in this case depends only on the field strength 31 which can be varied via the supply of the coil 4. The coil current may be set, for example, via the size of the supply voltage or, in the case of a constant voltage, by PWM modulation.

It is conceivable to combine the possibilities and to vary the strength of the pulse 10 via the pulse duration 34 and field strength 31. The pulse 10 does not have to be rectangular, but may have any curve profiles, such as, for example, sinusoidal (half wave) or sawtooth-shaped. In particular, curve profiles of capacitor discharges may be envisaged.

Furthermore, FIG. 2 shows diagrammatically, in the right part of the graph, a situation in which the coil 4 is also used for the time modification of the active magnetic field 9. If the coil 4 is acted upon only by a low and, for example, time-variable magnetic field 31a, which is depicted by an unbroken line in the right part of FIG. 2, the overall active magnetic field 9 or 9c is influenced correspondingly and, depending on its polarization, is strengthened or weakened. Dynamic influencing of the active magnetic field 9 is therefore also possible, without the magnetization of the hard-magnetic material being varied.

It is clear from FIG. 2 that the energy saving, as compared with a conventional system which requires current permanently, is considerable. The saving also depends on the frequency of magnetic reversals. Nevertheless, even in the case of frequent magnetic reversal, for example at the rate of seconds, the power and energy demand is lower than in the case of a comparable shock absorber according to the prior art. If magnetic reversal is actuated only as required, for example, in the case of a shock absorber, when the nature of the road changes, the advantage, as compared with other systems, is reflected considerably more clearly.

The magnetization of the magnetic device 7 can be weakened or reversed in polarity by means of magnetic pulses 10 of reverse polarity. Demagnetization can also be generated by a weakening magnetic alternating field, in which case the magnetic alternating field may be composed of sinusoidal half waves or of any other pulse shape with changing polarity and with decreasing amplitude.

Figure 3:
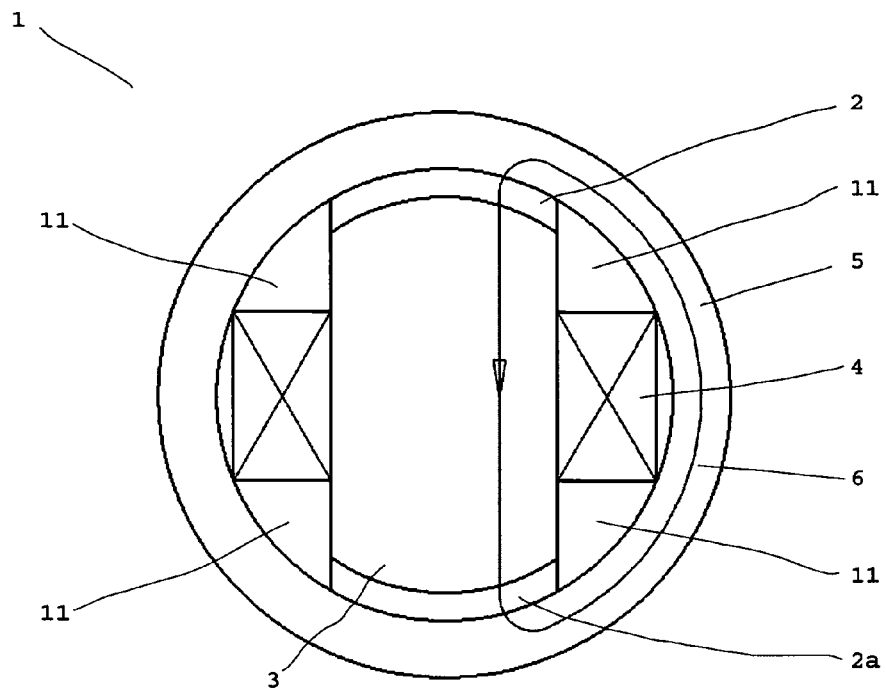
FIG. 3 shows a cross section through a design variant of a valve according to the invention.

FIG. 3 shows a cross section through a design variant of a valve 1 according to the invention, a flux line 6 of the magnetic field 9 being depicted for the sake of clarity. In the region of the flow ducts 2, the flux lines 6 pass virtually perpendicularly (normally to the pole faces 16) through the gap 27 and act normally to the flow direction of the magnetorheological fluid 12. The rheological effect thereby reaches its maximum.

The central core 3 is composed of a hard-magnetic material and is magnetized in the direction of the flux line 6 depicted. Directly adjacent to the core 3 are flow ducts 2 and 2a through which the flow passes perpendicularly to the drawing plane.

The ring conductor 5 surrounding a valve 1 serves, on the one hand, as a boundary of the flow ducts 2, 2a and, on the other hand, as a return for the magnetic field. The magnetic device 7 is composed of the core 3 and of the ring conductor 5, a coil 4 and insulators 11 also being provided additionally in the valve 1. The remaining gaps 27 serve as flow ducts 2 and 2a.

It is advantageous to manufacture from hard-magnetic material only that fraction of the magnetic device 7 which is necessary for being able to maintain a specific field strength 9 and flux density in the remaining part of the magnetic device 7 and in the flow duct 2. For example, only part of the core 3 may be made from Alnico and the rest may be composed of another ferromagnetic material.

It is also possible to manufacture the entire magnetic device 7 from a material having hard-magnetic properties. If, for example, the core 3 and ring conductor 5 are manufactured from hard-magnetic material, their respective coercivity can be lower than if only part of the core 3 is composed of hard-magnetic material.

In the illustration according to FIG. 3, a coil 4, which surrounds the core 3 and which can be used as a magnetic field generation device 8, can be seen on both sides of said core 3. The magnetic field 31 of the coil 4 overlays the field of the magnetic device 7 and, in the case of a corresponding strength, can vary the magnetization of the core 3 permanently.

Slight overlays of the magnetic field 31 which do not permanently change the magnetization of the magnetic device can likewise be generated by the coil 4. In this case, by means of the active magnetic field 9, the operating point of the valve 1 is fixed, and small and rapid corrections in the region of the operating point can be implemented with relatively low energy consumption by the coil 4.

In addition, insulators 11, which delimit the flow ducts 2 and 2a laterally and do not conduct or poorly conduct magnetically, are provided on the sides of the core 3. The material of the insulators 11 opposes high resistance to the magnetic flux, and therefore the latter is propagated for the most part within the core 3 and ring conductor 5 and passes through the flow ducts 2 and 2a as perpendicularly as possible.

In the version according to FIG. 3, the valve 1 is formed by the ring conductor 5, the core 3 received therein, the coil 4 and the magnetic insulators 11 and also the flow ducts 2 and 2a.

The ring conductor 5 may be designed, for example, as a pressure body and be integrated into a line system where the valve 1 can be used for controlling the flow.

However, a valve 1 according to this version may also be used, for example, in a piston 14 of a damper 13 or shock absorber. It is advantageous in this case that the damping properties can be varied by means of a current pulse 10 and consequently can be held permanently without any supply of energy.

Figure 4:
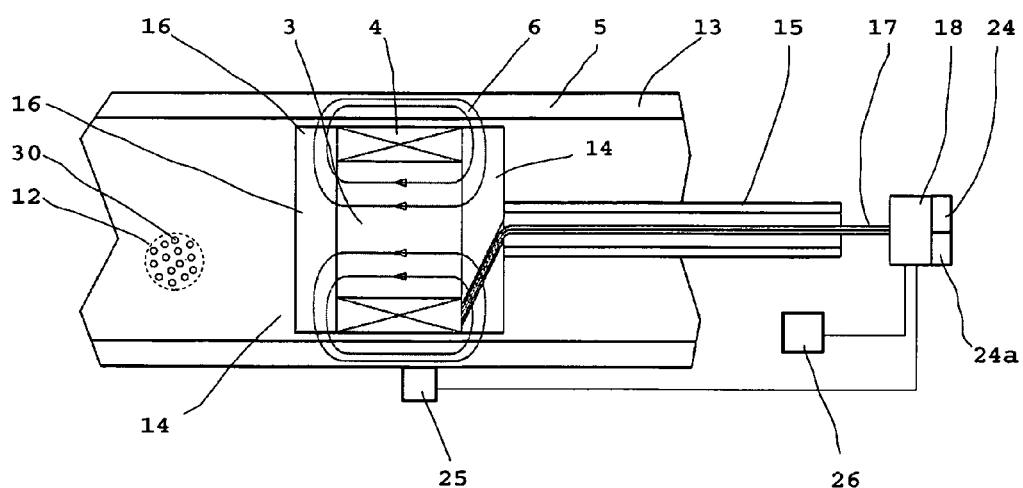
FIG. 4 shows a longitudinal section through a design variant as a piston in a shock absorber.

FIG. 4 shows a diagrammatic longitudinal section through a region of a magnetorheological shock absorber 13, flux lines 6 again being depicted for a better understanding.

The magnetic device 7 is composed here of a hard-magnetic core 3, of the pole caps 16 and of the ring conductor 5. The hard-magnetic core 3 generates a magnetic field 9, depending on the magnetization, that is to say it is a settable magnet. What applies here, too, is that any desired part of the magnetic device 7 may be composed completely or else only partially of hard-magnetic material.

The pole caps 16 adjacent to the core 3 conduct the field to the flow duct 2 through which the magnetic field 9 can pass in the region of the pole caps 16. The magnetic field 9 is returned to the opposite side of the piston 14 via the ring conductor 5.

The core 3 is surrounded by an electrical coil 4 which can permanently vary the magnetization of the core 3 via a magnetic pulse 10. Magnetization can in this case be canceled, assume any value between zero and the maximum possible magnetization (retentivity) or be reversed in polarity.

As a function of the active magnetic field 9, a flow resistance arises in the flow duct and correspondingly inhibits movement of the piston 14. The relative movement of the piston 14 with respect to the ring conductor 5 is transmitted by a piston rod 15.

Depicted diagrammatically in the piston rod 15 are connecting cables 17 which can connect the coil 4 to the supply and transmit sensor data of the sensor 25. The likewise diagrammatically depicted control device 18 may comprise control and regulation elements, the energy supply 24, sensors 25, a capacitor device 24a or a resonant circuit device 26.

In a shock absorber according to the prior art, an attempt is made to keep the remaining residual magnetization of the material as low as possible. A magnetic residual field would increase the flow resistance in the currentless state and thus reduce the setting range of the shock absorber 13. Moreover, the residual field opposes rapid magnetic reversal, and this may lower the response time of the shock absorber 13.

The shock absorber 13 illustrated in FIG. 4, in contrast to the prior art, has hard-magnetic material in order to obtain a magnetic field 9 which exists permanently as a result of its magnetization and which can be set as desired. An existing setting of the shock absorber 13 is maintained even in the currentless state, until the setting is changed by the coil 4 by means of a magnetic pulse 10.

This affords a substantial advantage of the shock absorber 13 illustrated in FIG. 4, as compared with the prior art: energy is required only during the adjustment of the shock absorber 13; the operation can otherwise take place in a completely currentless manner. Furthermore, the use of the magnetorheological fluid affords further advantages, such as, for example, a rapid reaction time, a wide adjustment range, a robust set-up, no moved mechanical setting elements, electrical activatability, etc.

In a typical application, when the shock absorber is adjusted only when there is a change in requirement profile, such as, for example, changing ground in the case of a bicycle shock absorber, the energy saving is very high, as compared with a shock absorber according to the prior art. Precisely with regard to mobile applications in which the system weight and the time of use are critical, smaller batteries and markedly longer operating times can be a very decisive technical advantage or make use possible for the first time.

To seal off the shock absorber piston 14 in the shock absorber housing, a piston ring may be provided as a seal. It is also possible, however, that the magnetic field of the magnetic device 7 itself or of magnets additionally attached ensures complete sealing off with respect to the shock absorber housing, since the magnetic field 9 of the magnetic device 7 causes chain formation of the particles 30 in the magnetorheological fluid 12, so that sufficient sealing off between the shock absorber housing and the piston 14 arranged therein is generated.

Figure 5:
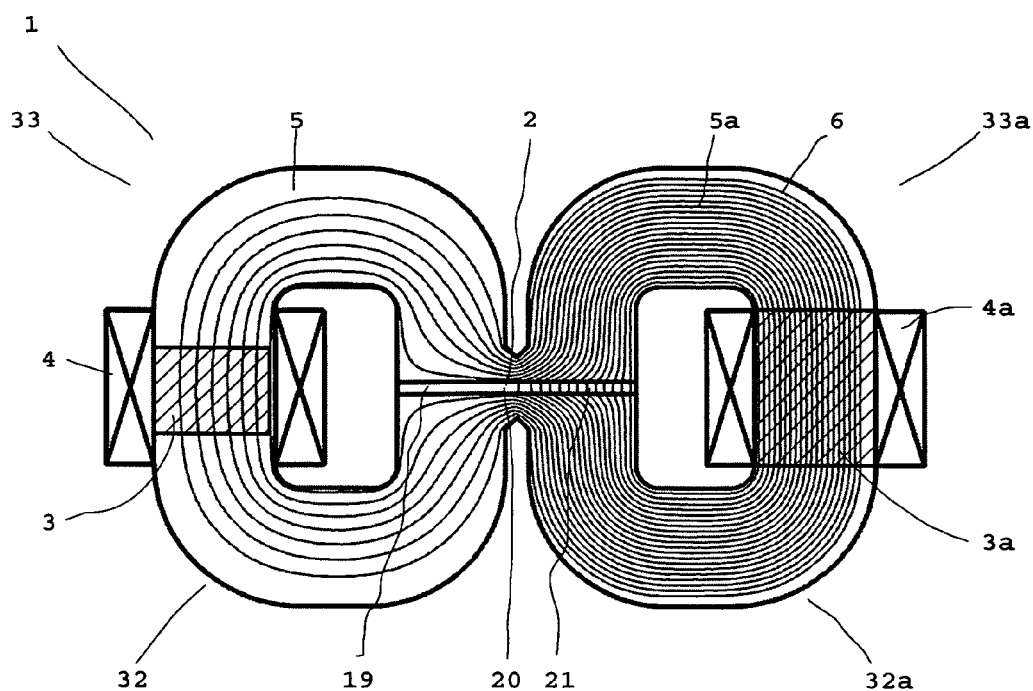
FIG. 5 shows a diagrammatic illustration of an alternative valve.
Figure 6:
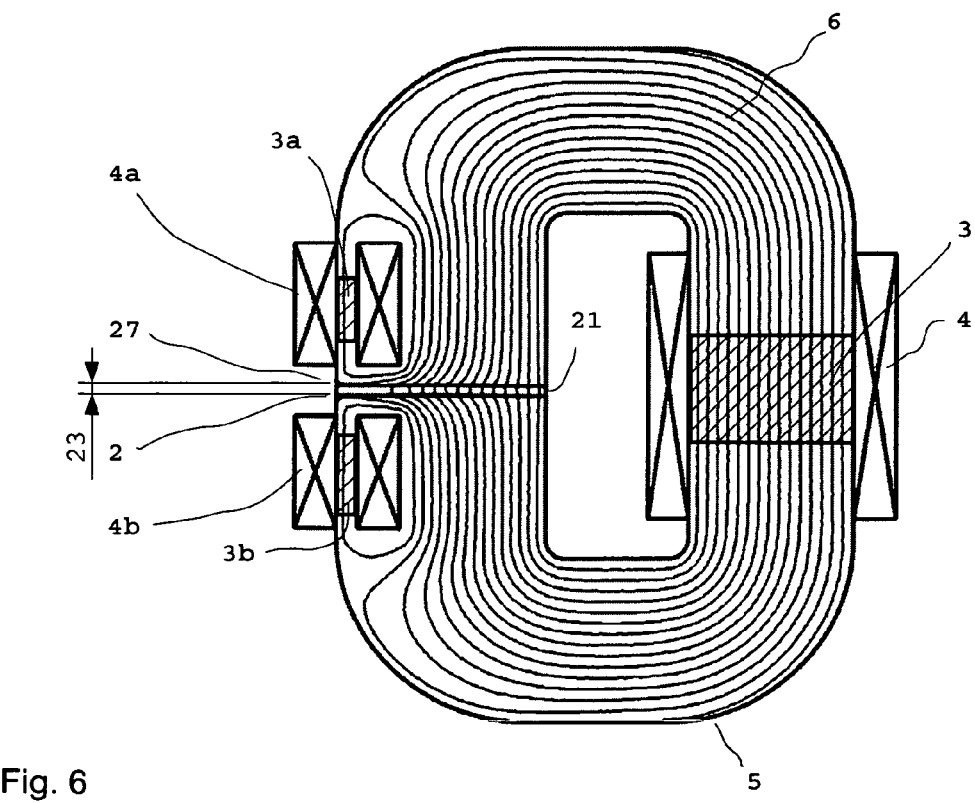
FIG. 6 shows a further diagrammatic illustration of an alternative valve.

FIGS. 5 and 6 illustrate further diagrammatic exemplary embodiments, two electrical coils 4, 4a (FIG. 5) and three electrical coils 4, 4a, 4b (FIG. 6) being used in conjunction with corresponding cores 3, 3a and 3b. The two exemplary embodiments have in common the fact that they can vary the active magnetic field 9 in the flow duct 2 not only in terms of its strength, but also in terms of its shape.

A central flow duct 2 is provided in FIG. 5, C-shaped elements 32 and 32a, which overall generate the ring conductor 5, being provided on both sides. In this case, the left half 33 and the right half 33a may initially be considered separately. The magnetic field generated by the core 3a in the right half 33a is guided by the ring conductor 5a as far as the flow duct 2 which here has a gap-like design.

Provided in the flow duct 2 is a magnetorheological fluid 12 which is exposed here, in the region of the right half 33a, to a strong magnetic field by the magnetic device 7. A blocking section 21 is thereby generated on the right half 33a and damps the flow there at a maximum.

The left half 33 of the flow duct 2 is influenced essentially by the magnetic field of the second core 3. Here, in the exemplary embodiment, a weak field is generated by the left core 3 and is polarized opposite to the field from the right core 3a, as may also be clearly gathered graphically from the density of the flux lines of the magnetic field. Part of the field from the right core 3a is thereby short-circuited via the left core 3 and there is no field present in the left region of the flow duct 2, with the result that the magnetorheological fluid 12 can flow, uninfluenced, in this region.

In the middle of the flow duct 2, the transition section 20 is formed, in which the field strength increases to the right. Depending on the pressure difference of the flowing medium, the latter flows only through the passage section 19, additionally a region of the transition section 20 or the entire flow duct 2. This can give rise, for example in use in a shock absorber 13, to specific shock absorber characteristic curves which can be adjusted within a wide range via magnetic pulses 10 from the coils 4, 4a.

Not illustrated in FIG. 5 are other magnetizations of the cores 3, 3a such as, for example, equally strong and homopolar magnetization of the two cores 3, 3a which generates a homogeneous magnetic field of variable strength in the entire flow duct 2. The magnetic field 9 can be adapted in shape and strength, within a wide range, via the design of the magnetic device 7 and the magnetization of the cores 3, 3a, such that virtually any desired flow resistance/velocity characteristic curves can be generated by the valve 1.

Any part of the cores 3 and 3a or of the ring conductors 5, 5a may be manufactured from hard-magnetic material, but the region wound around by the coils 4 and 4a is the most suitable, since especially high and homogeneous fields can be achieved there.

FIG. 6 illustrates a diagrammatic solution with three cores 3, 3a and 3b and with the associated electrical coils 4, 4a and 4b, the most diverse possible conditions for the flow duct 2 being obtained as a result of a different setting of the respective magnetization.

The sum of the individual magnetic fields of the cores 3, 3a and 3b gives an overall field 9 which floods the flow duct 2. In this case, as described in FIG. 5, the shape and strength of the resulting magnetic field 9 can be influenced. The right core 3 is here the main core, and it determines the basic strength of the field of the magnetic device 7. The left-side cores 3a and 3b are smaller and as control cores can influence the field of the magnetic device 7 in the flow duct 2.

If the control cores 3a, 3b are polarized identically to the main core 3, the flow duct 2 has prevailing in it a homogeneous magnetic field, the strength of which depends on the magnetization of all the cores 3, 3a and 3b. If the control cores 3a and 3b have reversed polarity with respect to the main core 3, an inhomogeneous magnetic field can be formed in the flow duct 2.

As in FIG. 5, various sections, such as the passage section 19, transition section 20 and blocking section 21, can thus be formed. The shape of the sections depends on the magnetization of the individual cores and can be set over a wide range. It is also possible for the two control cores 3a and 3b to have opposite polarity (in which case one then again has the same polarity as the main core 3). The setting range of the valve characteristic curves can thereby be further enlarged.

In contrast to FIG. 5, the hard-magnetic material must be arranged in the region of the coils 4, 4a and 4b so that a defined field can be generated in the flow duct 2 in the currentless state. Alternatively, however, the ring conductor 5 may have hard-magnetic properties in the subregion directly adjacent to the flow duct.

Figure 7:
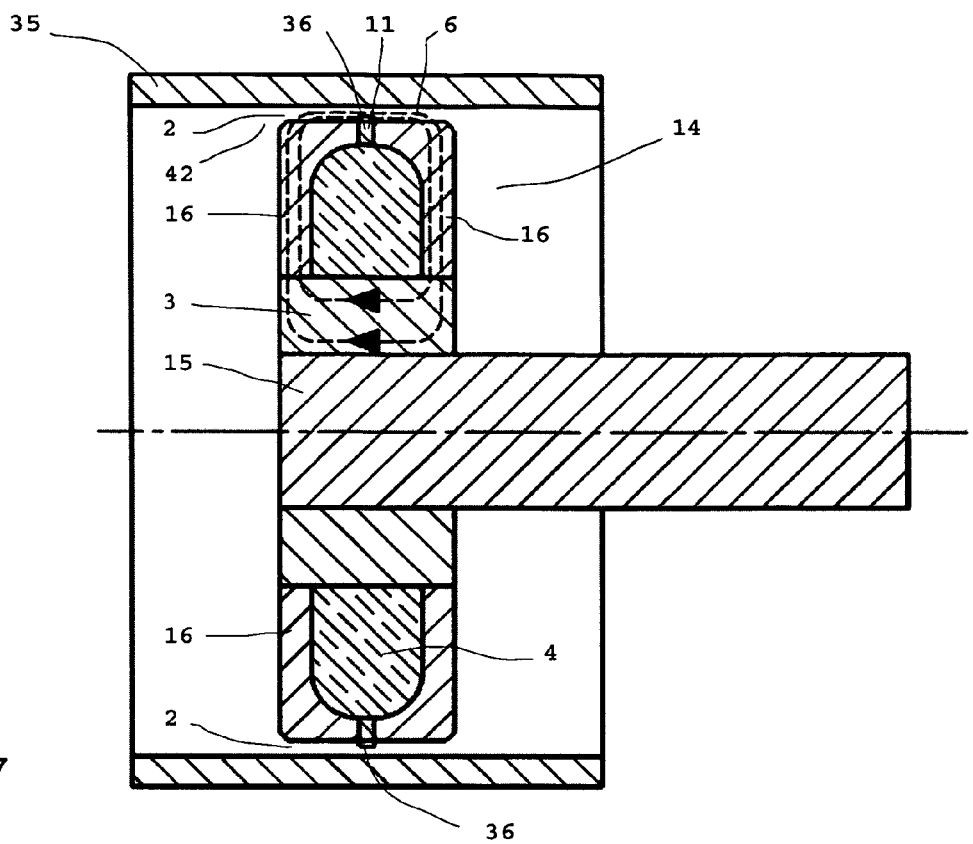
FIG. 7 shows a further valve in a sectional diagrammatic illustration.
Figure 8:
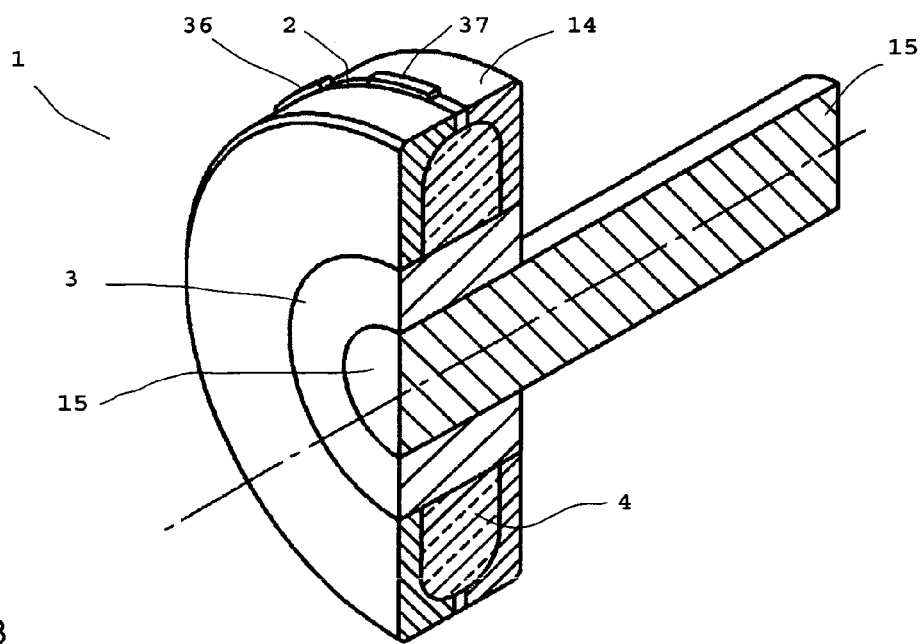
FIG. 8 shows the piston of the valve according to FIG. 7 in a diagrammatic perspective view.

FIGS. 7 to 9 illustrate a further exemplary embodiment, in which the magnetic field serves as a seal for a piston 14. The diagrammatic illustration shows the piston 14 or that part of the piston which seals off the two sides of the piston with respect to one another. The same set-up may also be used as a simple valve 1 in which further flow ducts may possibly be dispensed with. In this case, a gap is present as a flow duct 2 between the piston 14 and the cylinder 35. The gap may extend over the entire circumference of the piston 14 or else only over subregions thereof.

Depending on use as a valve or as a seal, the flow resistance or the blockable pressure difference from one piston side to the other can be varied via the strength of the magnetic field.

The gap or flow duct 2 reduces the friction, as compared with a conventional seal, and serves as a pressure relief device or, with retentivity or with only one coil 4, as variable overload protection. The annular gap 42 is here the controllable flow duct 2 and thus forms a simple valve 1.

In applications with magnetorheological fluids (MRF) 12 or ferrofluid, a volume, such as, for example, a high-pressure chamber 38, can be sealed off with respect to a second volume, such as, for example, a low-pressure chamber 39, by means of a magnetic field. Very low friction can thereby be achieved, as compared with conventional seals, which is advantageous, for example, in the case of linear piston movements or rotating shafts. In an actual example, only half the displacement force was measured, as compared with rubber seals.

In specific applications, it is in this case especially advantageous that the MRF, when it reaches a certain pressure difference, breaks through, and blocks again immediately as soon as the pressure peak is reduced. Thus, systems can be protected against overload or the seal assumes the function of a safety valve 1. If the magnetic field of the seal is generated by a material with variable magnetization, the pressure difference from which the MRF breaks through can also be set via the magnetization.

The exemplary embodiment illustrated in section in FIG. 7 shows the set-up of a valve 1 with a magnetic seal. The piston 14 is composed here of a piston rod 15 which is surrounded by a core 3. Two peripheral iron poles 16, on which a coil 4 is received, are provided radially further outside. The power supply may take place, for example, via a hollow piston rod 15 or wirelessly from outside.

A magnetic insulator 11 is provided radially on the outside between the poles 16. The magnetic insulator 11 may be used at the same time as a supporting ring 36 and/or as a guide ring. Located radially on the inside is the core 3 which is composed at least partially of hard-magnetic material. Any element of the magnetic circuit, such as, for example, the iron poles 16, may be composed here at least partially of hard-magnetic material.

In the magnetized state, the core 3 generates a magnetic field 9 which is illustrated by the flux lines 6 in the upper region of FIG. 7 and which is closed radially outside the piston 14 via the MRF. In this region, the MRF is thickened in such a way as to afford a sealing function from one piston side 38 to the other piston side 39. In this region, the flow of MRF is prevented up to a certain pressure difference, depending on the strength of the magnetic field.

Under overload (excess pressure or pressure above the desired or preset nominal value), the entire region of the annular gap 42 breaks through, but only until the set maximum pressure difference is undershot. As compared with mechanical overload systems, the very rapid reaction time and the opening of the entire flow duct 2 are advantageous. Moreover, no mechanically moved parts can wear the flow duct 2.

The magnetization of the hard-magnetic material can be varied by means of the coil 4. A single short pulse is sufficient to vary the magnetization of the hard-magnetic material permanently and thus to adapt the maximum blockable pressure difference.

The set-up illustrated may as a magnetic seal also be part of a larger piston unit or, as depicted, be used as a simple piston 14. A possible simple piston set-up dispenses with further flow ducts or with ducts which can be influenced in another way and uses the radially outer gap with MRF as a flow duct 2. This set-up may also be employed expediently for sealing off shafts, linear guides or flow ducts of any shape.

A plurality of the set-ups illustrated may be combined into a larger multipolar piston unit, for example in order to increase the blockable pressure difference.

Preferably, the magnetic field is closed via the annular gap 42, not via the cylinder 35, since in this case the cylinder 35 can be manufactured from a magnetically nonconductive material, such as, for example, aluminum or plastic, and can consequently have a substantially lighter-weight set-up than with ferromagnetic material. The magnetic field attempts via the supporting ring 36 to form "cushions" of MRF, with the result that the piston 14 is also centered automatically.

A ferromagnetic cylinder 35 is attracted by the magnetic field of the seal and could be positioned off-center/eccentrically, which could increase the basic friction and wear. In such cases, it is appropriate to employ a supporting ring 36 with supporting noses 37. A set-up with a ferromagnetic cylinder is also expedient if such guide and supporting elements are adopted. Alternatively, the piston 14 may be supported/guided on both sides via a continuous piston rod 15.

FIG. 9 shows the piston 14 with the supporting ring 36 in a front view. A sufficient gap to form the flow duct 2 remains between the individual supporting noses 37.

In comparison with a conventional valve according to the prior art, a valve 1 according to the invention with this set-up has a substantially better energy balance and heat economy. The coil 4 has to generate a magnetic pulse once only for the purpose of setting the desired magnetization. Magnetization can then subsequently be held permanently and without any further energy being supplied. The possible low energy consumption of this seal or of this valve 1 is generally advantageous, particularly in portable applications.

As compared with conventional seals, such as, for example, O-rings, a seal having a set-up according to the invention has substantially lower friction and a correspondingly better stick/slip behavior. Moreover, the surfaces do not have to have such high tolerances and surface properties as those of conventional seals.

FIGS. 10 and 11 show a set-up comparable to FIGS. 7 to 9. The magnetic device 7 with the core 3 made from hard-magnetic material and with the iron poles 16 is located inside the cylinder 35 and is connected at the piston rod 15 via a nonmagnetic sleeve 11.

FIG. 10 shows the set-up in the normal operating state, that is to say during operation with uniform properties (blocking pressure or flow resistance). The magnetization of the hard-magnetic material is not varied. The magnetic field 9 generated as a result of the respective magnetization of the core 3 is conducted radially outward via the poles 16 to the flow duct 2 where it is closed via the MRF.

FIG. 11 shows the unit from FIG. 10 during magnetic reversal. For this purpose, a magnetic field generation unit 8, which may lie outside the cylinder, is necessary. The magnetic field generation device 8 is located outside the cylinder 35 and can act through the latter upon the magnetic device 7.

In this case, the outer and the inner poles 16 lie essentially opposite one another, with the result that the magnetic field 31 generated by the magnetic field generation device 8 can be closed via the core 3. In this operating state, the magnetization of the core 3 can be varied via magnetic pulses 10.

The nonmagnetic cylinder 35 constitutes for the magnetic field, during magnetic reversal, an additional resistance which, however, can be compensated by a larger coil 4 or stronger pulses. For this purpose, the iron poles 16 lying outside the cylinder 35 are shielded by the cylinder 35 and in normal operation do not constitute a magnetic short circuit for the magnetic device 7. All or at least a large part of the flux lines 6 are closed in the flow duct 2.

The advantage of this set-up is that the energy supply of the coil 4 can be implemented in a simple way, since the latter lies outside and can be immovable with respect to the supply. Moreover, the power loss occurring can be dissipated in a simple way.

The piston 14 does not always have to be located radially inside the magnetic field generation device 8, both may also be movable in relation to one another. The change in magnetization is then preferably carried out in a specific relative position. It is conceivable that the magnetic field generation device 8 belongs to an external unit which does not have to be connected to the valve 1 during normal operation. The external unit is necessary only for changing the magnetization, such as, for example, for setting a specific damping force, and in normal operation the valve 1 functions without this unit.

This may be a significant advantage, above all in the case of portable units, since construction space and weight can thereby be markedly reduced. In a similar way to a system with a rechargeable battery, the charger or the external unit is necessary only for charging or for adjusting the magnetization. The charger or the magnetic field generation device 8 does not always have to be carried along and may also be used for various systems.

Since the magnetic field generation device 8 does not have to be connected fixedly to the piston 14, the moved masses can be kept very low. The set-up is consequently suitable for dynamic applications with a very rapid response behavior. Owing to the smaller piston 14, construction space and weight can be saved, and moreover, for example, more lift can be achieved for the same installation length.

The most diverse possible versions may be envisaged, movement always being in relation to the magnetic field generation device 8.

Inter alia, the following variants are provided:
The piston 14 moves and the cylinder 35 is stationary: for magnetic reversal, the piston should be located at a specific position.
The piston is stationary and the cylinder moves: magnetic reversal is possible independently of position.
The piston and the cylinder move: magnetic reversal is expedient in specific piston positions.

In versions where magnetic reversal is possible only as a function of a specific piston position, a sensor can detect the current piston position. It is in this case possible to use the existing coil 4 of the magnetic field generation device 8 as a sensor. Depending on the application, the coil 4 may in this case passively detect the magnetic field 6 of the moving magnetized piston 14 or actively generate a weak field which is also influenced by a non-magnetized piston as a function of the piston position.

Further advantages of this embodiment:
The magnetic field generation device 8 lies on the outside, with the result that the piston 14 can have a very light-weight design, thus signifying low moved masses. A better response behavior is thereby obtained.
The piston 14 can have a shorter build without a coil 4, thus, in turn, reducing the masses and leading to a lower construction height or more lift.
The power loss of the coil 4 is generated outside the piston/cylinder unit, from where the heat occurring can be dissipated easily.
A supply of power to moving parts is not necessary, thus affording a simple and robust set-up.
A plurality of actuators can be magnetized or magnetically reversed by means of one electrical coil 4.
Safe magnetic reversal is possible outside hazardous locations, for example at explosion-protected locations or in regions with chemically aggressive media.

A further possibility for using an external unit for the magnetic reversal of the magnetic device 7 is protection against manipulation or sabotage. In a similar way to a "magnetic key", an external magnetic field generation unit 8 can prevent a situation where unauthorized persons operate appliances or change settings.

Use as an adaptive flow duct 2 between two MRF chambers having different pressure is advantageous. A very simple set-up, which can easily be used, for example, in skiing, is obtained.

FIG. 12 shows, as an example of use, a ski 50 with a shock absorber 13 having a set-up according to the invention. The same principle may also be employed for shock absorbers 13 in bicycles, prostheses, fitness equipment and much more. The movement or deformation of the ski 50 is conducted here in a directed manner to the shock absorber 13 which converts it and thereby damps it. In contrast to damping by deformable (elastic) elements, a piston/cylinder shock absorber 13 having the set-up according to the invention can be adjusted consistently, quickly and simply and can be adapted within wide ranges. Especially the long-term stability (reproducibility over the lifetime) is much higher than in the case of a deformable element. Skis according to the present prior art become softer (material fatigue) with each travel day, and even after approximately 50 travel days the pretension may be almost completely absent. This is not so in the case of a piston/cylinder shock absorber 13.

Depending on the instantaneous travel style, the nature of the piste, the temperature and other parameters, the shock absorber 13 can be adjusted or set, and this setting can be held currentlessly. Owing to retentivity, electrical adjustment becomes possible with a very low energy demand, but is nevertheless quick and continuous.

Precisely with regard to the ski 50, it is highly advantageous if the setting of the damping is carried out fully automatically, without the user having to take action. For example, in a change from deep snow to a well prepared piste, the behavior of the ski 50 should change, without the skier having to stop and remove the skis in order to carry out any mechanical settings.

FIG. 13 shows diagrammatically a possible set-up in which the magnetic field in the flow duct 2 can be varied quickly, without the current magnetization of the hard-magnetic material being changed.

A dynamic field change thereby becomes possible, without any change in the magnetization of the magnetic device 7. A plurality of magnetic circuits may act upon the same flow duct 2. This allows variations in the magnetic field on the basis of the operating point set via retentivity and can thus be markedly quicker than a straightforward retentivity set-up, but always requiring markedly less energy than a set-up without retentivity.

The core 3 is composed at least partially of a hard-magnetic material, such as, for example, Alnico. The magnetization of the core 3 can be varied by means of pulses from the retentivity coil 4 and generates in the magnetic device 7 a magnetic field 9 which acts in the flow duct 2 upon the MRF 12.

The magnetic device 7 offers to the magnetic flux on the right side in FIG. 13 an alternative path which is interrupted by a control gap 43. The flux lines 6 can thus be closed on the left side via the flow duct 2 (flow side) or on the right side via the control gap 43 (control side). In the currentless basic state, the entire part or at least a large part of the magnetization in the flow duct 2 should take effect. This is achieved when the reluctance of the flow side is markedly lower than the reluctance of the control side.

Located on the control side is a control coil 4a which can influence the control-side magnetic flux. Depending on the current flux in the control coil 4a, part of or even the entire magnetic flux of the core 3 can flow in the control-side magnetic circuit, with the result that the magnetic field in the flow duct 2 can be reduced, without the magnetization of the core 3 being varied. It is also possible by means of the control coil 4a to strengthen the magnetic field of the core 3 in order to obtain a stronger magnetic field in the flow duct 2 than in the currentless basic state.

The control coil 4a may also be employed when the magnetization of the core 3 is varied by means of the retentivity coil 4. On the one hand, said control coil can reinforce the action of the retentivity coil 4 and, on the other hand, can compensate on the control side that fraction of the magnetic field which is necessary for magnetization, so that, in spite of the magnetization pulse 10, no field change or only a relatively small field change occurs in the flow duct 2.

One possible example of use is a bicycle shock absorber or ski shock absorber, the retentivity of which corresponds to the current ground. The hard-magnetic material has been magnetized in such a way that, for example, the shock absorber 13 is correctly set for travel in the forest or in deep snow and effectively damps the average shocks occurring. Spontaneously occurring deviations, such as a very hard knock caused by traveling over a large root or hump, can be compensated quickly without magnetic reversal. If, however, the ground changes, the (currentlessly holdable) operating point of the shock absorber 13 can be adjusted by different magnetization.

FIGS. 14 and 15 show a design variant of the valve 1 according to FIG. 7. In this case, the core 3 lying between the poles 16 is manufactured from hard-magnetic materials having different magnetic properties.

In the example illustrated, the radially inner region 44 of the core 3 is composed of NdFeB and the radially outer region 45 of Alnico. In the version illustrated, therefore, the core 3 is composed partially of a fixed permanent magnet 3a, to be precise the inner region 44, and partly of a variable permanent magnet 3b, to be precise the outer region 45.

Other hard-magnetic materials may also be used, but these must have magnetic properties different from one another. Applications may also be envisaged in which the same material is used, but the magnetic properties are varied via its dimensioning.

In FIG. 14, both regions 44, 45 of the core 3 are magnetized with the same polarity. The field 9 thereby arising is conducted via the poles 16 radially outward to the flow duct 2 where it is closed via the MRF 12. An electrical coil 4 and a magnetic insulator 11 are located between the poles 16.

FIG. 15 shows the valve 1 from FIG. 14 in another operating state. The magnetization of a region of the core 3 has been varied via a magnetic pulse 10 from the coil 4. In this case, the polarity of the outer core region 45 with variable magnetization 3b has been rotated so that it is now opposite to the polarity of the inner core region 44 with fixed magnetization 3a. The magnetic field 9 of both core regions 44, 45 is of approximately equal strength, but of different polarity, so that it is closed via the poles 16, without influencing the flow duct 2.

Intermediate positions between a maximum field strength 9 (FIG. 14) and a minimum field strength 9 (FIG. 15) in the flow duct 2 can also be generated as a function of the magnetization of the outer core region 45 with variable magnetization 3b. In this case, the outer core region 45 with variable magnetization 3b short-circuits any part of the magnetic field of the inner core region 44 with fixed magnetization 3a or strengthens this part.

The advantage of this set-up is that comparatively little material has to be magnetically reversed in order to change the magnetic field in the flow duct 2. The magnetic reversal operation can consequently be carried out more quickly and with less energy demand.

A very strong magnetic field can be generated with relatively little material by means of materials such as, for example, NdFeB, with the result that the magnetic device 7 becomes smaller. Moreover, the coil 4 can also become smaller, since it has to magnetically reverse less material. Construction space and weight can thereby be saved.

It is especially advantageous if the set-up is configured such that the coil 4 can act directly upon the core region 45 with variable magnetization 3b. For example, if the piston 14 is set up radially from the inside outward as follows: core region 45 with variable magnetization 3b (Alnico), coil 4, core region 44 with fixed magnetization 3a (NdFeB).

Other set-up variants may, however, also be envisaged, in which the elements described are mounted in direct contact or so as to be spaced apart from one another. Moreover, further elements, such as coils 4, poles 16, control gaps 43, etc., which influence the magnetic field in the flow duct 2 may also be arranged in the magnetic device 7.

List Of Reference Symbols

1 Valve
2, 2a Flow duct
3, 3a, 3b Core
4, 4a, 4b Coil
5, 5a Ring conductor
6 Flux line
7 Magnetic device
8 Magnetic field generation device
9, 9a, 9b, 9c Magnetic field of the magnetic device
10 Magnetic impulse of the coil
11 Insulator
12 Magnetorheological fluid
13 Shock absorber, shock absorber housing
14 Piston
15 Piston rod
16 Pole
17 Connecting cable
18 Control device
19 Passage section
20 Transition section
21 Blocking section
23 Gap width
24, 24a Energy accumulator, capacitor
25 Sensor
26 Resonant circuit device
27 Gap
30 Particle
31, 31a Magnetic field of the magnetic field generation device
32, 32a C-shaped elements
33 Left half
33a Right half
34 Pulse duration
35 Cylinder
36 Supporting ring
37 Supporting nose
38 High-pressure chamber
39 Low-pressure chamber
40 Gap
41 Duct boundary
42 Annular gap
43 Control gap
44 Inner region
45 Outer region
50 Ski

The invention claimed is:

1. A valve for a magnetorheological fluid, comprising:
    at least one flow duct for conducting a flow of the magnetorheological fluid therethrough;
    a magnetic device disposed to subject said at least one flow duct to a variable magnetic field, to set a flow resistance in said at least one flow duct by way of the magnetic field in the flow duct;
    said magnetic device being composed at least partially of hard-magnetic material for generating a permanent magnetic field;
    a magnetic field generation device configured for generating magnetic pulses and disposed for varying a permanent magnetization of said magnetic device lastingly with at least one magnetic pulse, in order to lastingly vary the magnetic field acting in the flow duct and the flow resistance of said at least one flow duct.

2. The valve according to claim 1, wherein said magnetic field generation device is configured to set the permanent magnetization of said magnetic device to any desired value between zero and retentivity by generating at least one magnetic pulse, and said magnetic field generation device is configured to vary a polarity of the magnetization.

3. The valve according to claim 1, wherein said magnetic device is capable of generating a permanent static magnetic field, and the magnetic field can be overlaid with a dynamic magnetic field of the magnetic field generation device, without the permanent magnetic field thereby being varied.

4. The valve according to claim 1, wherein said magnetic field generation device comprises at least one electrical coil and at least one energy supply device selected from the group consisting of a capacitor device, an accumulator, and a battery for supplying energy for generating the at least one magnetic pulse.

5. The valve according to claim 1, which further comprises at least one sensor device.

6. The valve according to claim 1, which comprises a resonant circuit device configured for generating a damped magnetic alternating field for demagnetization, the alternating field being composed of polarity-changing waves having a decreasing amplitude.

7. The valve according to claim 1, wherein said hard-magnetic material of said magnetic device has a coercivity greater than 1 kA/m.

8. The valve according to claim 1, wherein said flow duct is subject to exposure to an inhomogeneous magnetic field.

9. The valve according to claim 1, wherein a shape and a strength of the magnetic field in the magnetic device and/or in the flow duct being maintained lastingly and being capable of being varied by at least one magnetic pulse from said magnetic field generation device.

10. The valve according to claim 1, wherein individual regions of said magnetic device have mutually different hard-magnetic properties, rendering said magnetic device divisible into regions with fixed or variable magnetization.

11. The valve according to claim 1, wherein said magnetic field generation unit is capable of being spaced apart from and without mechanical connection to said magnetic device.

12. A shock absorber, comprising at least one valve according to claim 1 utilized for setting a damping characteristic and damping behavior of the shock absorber.

* * * * *